United States Patent
Maeda et al.

(10) Patent No.: US 6,361,724 B1
(45) Date of Patent: Mar. 26, 2002

(54) PROCESS FOR THE PRODUCTION OF RESIN PELLET

(75) Inventors: Mutsumi Maeda, Chiba; Hiroshi Yamaki; Hiroaki Ishikawa, both of Kanagawa, all of (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 09/695,290

(22) Filed: Oct. 25, 2000

(51) Int. Cl.[7] .................................................. B28B 1/26
(52) U.S. Cl. ............................. 264/85; 264/50; 264/54; 264/87; 264/141; 264/142
(58) Field of Search .......................... 264/85, 141, 142, 264/143, 50, 54, 87

(56) References Cited

U.S. PATENT DOCUMENTS 5,605,937 A * 2/1997 Knaus .......................... 521/60
5,922,826 A * 7/1999 Kuze et al. .................. 528/186

* cited by examiner

*Primary Examiner*—Morton Foelak
(74) *Attorney, Agent, or Firm*—Birch, Stewart, Kolasch & Birch, LLP

(57) ABSTRACT

A process for producing a thermoplastic resin pellet, which comprises melt-kneading a thermoplastic resin to obtain a thermoplastic resin pellet, wherein the thermoplastic resin comprising: (A) at least one thermoplastic resin selected from the group consisting of polyphenylene ether-based resins, polyacetal-based resins, polyamide-based resins, polystyrene-based resins, acrylic resins, polyester-based resins, polycarbonates, polyphenylene sulfides, polyetherimides, polyethersulfones, polysulfones, polyether (ether) ketones; and (B) a carbon dioxide gas contained in thermoplastic resin (A) in an amount of from 0.3 to 20.0 parts by weight per 100 parts by weight of thermoplastic resin (A).

12 Claims, No Drawings

PROCESS FOR THE PRODUCTION OF RESIN PELLET

FIELD OF THE INVENTION

The present invention relates to a thermoplastic resin which can be used as a plastic material in the industry of electric and electronic appliances, automobile, other various industrial materials, and food package.

BACKGROUND OF THE INVENTION

A thermoplastic resin is excellent in workability and productivity and can be subjected to molding method such as melt injection molding and melt extrusion molding by which products or parts having a desired shape can be efficiently produced. Thus, a thermoplastic resin can be widely used as material of products and parts in the art of electrical and electronic appliances, automobile, other industrial materials and food packaging.

In recent years, there has been a growing demand for the enhancement of heat resistance of products and parts particularly in the art of electric and electronic appliances, automobile and other various industries. Accordingly, many high heat resistance thermoplastic resins have been developed. However, the enhancement of heat resistance is accompanied by the rise in the melt-kneading temperature at which the thermoplastic resin is pelletized. Since the melt-kneading temperature rises close to the decomposition temperature of the thermoplastic resin, various problems arise.

In other words, as the melt-kneading temperature at which the thermoplastic resin is pelletized approaches the decomposition temperature of the resin, the resulting thermal deterioration causes discoloration and carbonization. Thus, products and parts obtained by molding the thermoplastic resin are disadvantageous in color tone and external appearance.

In order to solve these problems, an approach which comprises melt-kneading a thermoplastic resin having an additive such as heat stabilizer and oxidation inhibitor incorporated therein has heretofore been proposed. However, a high heat resistance thermoplastic, if used, resin must be melt-kneaded at a high temperature and thus leaves something to be desired in color tone and external appearance in the form of molded article even if provided with such an additive.

As a technique for improving color tone and external appearance there has long been practiced a method which comprises adding a plasticizer such as mineral oil to a thermoplastic resin to lower the melt-kneading temperature of the resin. The molded article produced from the thermoplastic resin according to this method has a good color tone and external appearance but exhibits deteriorated heat resistance and mechanical properties.

Accordingly, the prior art thermoplastic resin pallet and the molded article obtained by working the thermoplastic resin have ill-balanced color tone, external appearance, heat resistance and mechanical properties and thus cannot sufficiently meet the demands of the industry.

JP-A-10-34726 (The term "JP-A" as used herein means an "unexamined published Japanese patent application") and JP-A-11-28754 disclose a method for extrusion-forming a difficultly moldable resin material such as ultrahigh molecular polyethylene which comprises allowing the resin to adsorb an inorganic gas such as a carbon dioxide gas, melt-kneading the resin, and then extrusion-forming the resin. In accordance with this method, a molten resin with an inorganic gas incorporated therein is supplied into a mold where it is then extrusion-formed to obtain a desired molded article. This technique contemplates sufficient cooling of the molded article in the mold for the purpose of preventing the foaming of the surface of the molded article. However, this method is disadvantageous in that it can difficultly produce a thermoplastic resin pellet.

Further, JP-A-10-128783 and WO98/52734 disclose a method which comprises subjecting a thermoplastic resin containing a carbon dioxide gas to melt-kneading in the cylinder of a molding machine, and then supplying the resin thus melt-kneaded into a mold where it is then molded, characterized in that the carbon dioxide gas is dissipated from the molded article to the atmosphere. However, these patents have no suggestions for process of the production of a thermoplastic resin pellet which exhibits good color tone, external appearance and physical properties in molded form.

Moreover, JP-A-9-104780, JP-A-10-53662 and WO98/31521 disclose a method for the production of an extruded foamed product which comprises injecting a foaming agent such as a compressed carbon dioxide gas into the extruder. However, this method merely contemplates the use of a carbon dioxide gas as a foaming agent. These patents, too, have no suggestions for process of the production of a thermoplastic resin pellet which exhibits good color tone, external appearance and physical properties in molded form.

SUMMARY OF THE INVENTION

It is therefore an object of the invention to provide a molded article of a thermoplastic resin pellet which has well-balanced color tone, external appearance, heat resistance and mechanical properties and thus can sufficiently meet the demands of the industry.

It is another object of the invention to provide a thermoplastic resin pellet which exhibits improved color tone and external appearance while maintaining desired heat resistance and mechanical properties by inhibiting discoloration and carbonization due to thermal deterioration of the thermoplastic resin at the step of melt-kneading.

Other objects and effects of the present invention will become apparent from the following description.

The inventors made extensive studies of a process for the production of a thermoplastic resin pellet excellent in moldability, color tone, external appearance, heat resistance and mechanical properties. As a result, it was found that a thermoplastic resin pellet obtained by melt-kneading a mixture comprising a carbon dioxide gas incorporated therein in an amount of from 0.3 to 20.0 parts by weight based on 100 parts by weight of a specific thermoplastic resin (A) is excellent in color tone and external appearance and also provides a molded article having excellent properties in color tone, external appearance, heat resistance and mechanical properties. The present invention has been thus worked out.

That is, the above-described objects of the present invention have been achieved by providing the following production processes.

1) A process for producing a thermoplastic resin pellet, which comprises melt-kneading a thermoplastic resin to obtain a thermoplastic resin pellet, wherein said thermoplastic resin comprising:

(A) at least one thermoplastic resin selected from the group consisting of polyphenylene ether-based resins, polyacetal-based resins, polyamide-based resins, polystyrene-based resins, acrylic resins, polyester-based resins, polycarbonates, polyphenylene sulfides, polyetherimides, polyethersulfones, polysulfones, polyether (ether) ketones; and (B) a carbon dioxide gas contained in said thermoplastic resin (A) in an amount of from 0.3 to 20.0 parts by weight per 100 parts by weight of said thermoplastic resin (A).

2) The production process according to the above item 1), wherein said thermoplastic resin (A) comprises at least one combination selected from: a polyphenylene ether-based resin and a polyamide-based resin; a polyphenylene ether-based resin and a polystyrene-based resin; a polyphenylene ether-based resin and a polyolefin-based resin; a polyphenylene ether-based resin and a polyester-based resin; a polyamide-based resin and a polyolefin-based resin; and a polyacetal-based resin and a polyolefin-based resin.

3) The production process according to the above item 1), wherein said thermoplastic resin (A) is a thermoplastic resin containing at least one member selected from the group consisting of polyphenylene ether-based resins, polyacetal-based resins, polyamide-based resins, polystyrene-based resins, acrylic resins, polyetherimides, and polyethersulfones.

4) The production process according to the above item 1), wherein said thermoplastic resin (A) is a thermoplastic resin containing any of a polyphenylene ether-based resin, a polyacetal-based resin and a polyamide-based resin, or containing at least one combination selected from: a polyphenylene ether-based resin and a polyamide-based resin; a polyphenylene ether-based resin and a polystyrene-based resin; a polyphenylene ether-based resin and a polyolefin-based resin; a polyphenylene ether-based resin and a polyester-based resin; a polyamide-based resin and a polyolefin-based resin; and a polyacetal-based resin and a polyolefin-based resin.

5) The production process according to any one of the above items 1) to 4), wherein said melt-kneading is carried out using a mixing machine, during which said carbon dioxide gas is allowed to be dissipated, and pelletization of the melt-kneaded thermoplastic resin is carried out after said carbon dioxide dissipation.

6) The production process according to any one of the above items 1) to 5), wherein said melt kneading is carried out using a twin-screw extruder as the mixing machine, and said carbon dioxide gas is dissipated through a vent in said twin-screw extruder.

7) The production process according to the above item 6), wherein said vent is connected to a suction pump to dissipate said carbon dioxide gas.

The resin viscosity during the melt-kneading is reduced by a plasticizing effect of the carbon dioxide gas, making it possible to effectively inhibit heat generation due to shearing. Therefore, occurrence of thermal deterioration, discoloration and carbonization is prevented. The thermoplastic resin pellet of the invention thus obtained is excellent in color tone and external appearance.

Further, the thermoplastic resin according to the invention is excellent in all of color tone, external appearance, heat resistance and mechanical properties, and thus can provide products and parts that meet sufficiently the demands of various industries.

Moreover, molded articles obtained by working further the thermoplastic resin pellet of the invention are also excellent in all of color tone, external appearance, heat resistance and mechanical properties, and thus can provide products and parts that that meet sufficiently the demands of various industries.

DETAILED DESCRIPTION OF THE INVENTION

The thermoplastic resin (A) according to the invention is a plastic material which can be subjected to molding such as melt-injection molding and melt-extruding molding to produce products or parts having a desired shape and thus is widely used as a material for products and parts in the industry of electric and electronic appliances, automobile and other various industrial materials.

The thermoplastic resin (A) according to the invention comprises one or more thermoplastic resins selected from the group consisting of polyphenylene ether-based resin, polyacetal-based resin, polyamide-based resin, polystyrene-based resin, acrylic resin, polyester-based resin, polycarbonate, polyphenylene sulfide, polyetherimide, polyethersulfone, polysulfone, polyether (ether) ketone and polyolefin-based resin.

The polyphenylene ether-based resin has a bond unit represented by the following general formula:

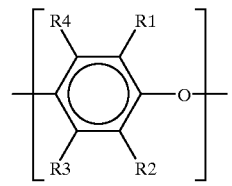

wherein R1, R2, R3 and R4 may be the same or different and each represent an atom or group selected from the group consisting of hydrogen atom, halogen atom, $C_{1-7}$ primary or secondary lower alkyl, phenyl, haloalkyl, aminoalkyl or hydrocarbon oxy group or halohydrocarbon oxy group having at least two carbon atoms interposed between halogen atom and oxygen atom.

The polyphenylene ether-based resin of the invention is a polymer or copolymer having a reduced viscosity of from 0.15 to 0.70, preferably from 0.20 to 0.60 as measured at 30° C. in a 0.5 g/dl chloroform solution.

Specific examples of the polyphenylene ether-based resin of the invention include poly(2,6-dimethyl-1,4-phenyleneether), poly(2-methyl-6-ethyl-1,4-phenyleneether), poly(2-methyl-6-phenyl-1,4-phenyleneether), and poly(2,6-dichloro-1,4-phenyleneether).

Other specific examples of the polyphenylene ether-based resin of the invention include a polyphenylene ether copolymer such as copolymer of 2,6-dimethylphenol with other phenols (e.g., 2,3,6-trimethylphenol, 2-methyl-6-butylphenol).

As the polyphenylene ether-based resin of the invention there is preferably used poly(2,6-dimethyl-1,4-phenyleneether) or copolymer of 2,6-dimethylphenol with 2,3,6-trimethylphenol.

Most preferred among the polyphenylene ether-based resins of the invention is poly(2,6-dimethyl-1,4-phenyleneether).

In the invention, a polyphenylene ether-based resin derivative obtained by the reaction of one or more compounds selected from the group consisting of αβ-unsaturated carboxylic acid, αβ-unsaturated carboxylic acid ester and αβ-unsaturated carboxylic anhydride with the foregoing polypheylene ether-based resin, too, can be used as a polyphenylene ether-based resin.

The process for the production of the polyphenylene ether-based resin to be used herein is not limited.

An example of the process for the production of the polyphenylene ether-based resin to be used herein is a process involving the oxidation polymerization of 2,6-xylenol in the presence of a complex of cuprous salt with amine as a catalyst disclosed in U.S. Pat. No. 3,306,874.

Processes disclosed in U.S. Pat. Nos. 3,306,875, 3,257,357 and 3,257,358, JP-B-52-17880, and JP-A-50-51197 and JP-A-63-152628 can be preferably used as process for the production of polyphenylene ether-based resin.

The polyacetal-based resin of the invention may be a homopolymer or copolymer. The polyacetal-based resin of the invention also may be a block polymer having a polyacetal molecule chemically terminated by other components such as lubricating polymer and silicon.

A specific example of the polyacetal-based resin of the invention is a polyacetal homopolymer obtained by polymerizing formaldehyde or a cyclic oligomer such as trioxane, which is a trimer of formaldehyde, and tetraoxane, which is a tetramer of formaldehyde, and blocking the terminal of the polymer thus obtained by an ether or ester group or a composition comprising as a main component a polyacetal copolymer composition obtained by subjecting a cyclic oligomer such as trioxane, which is a trimer of formaldehyde, and tetraoxane, which is a tetramer of formaldehyde, a cyclic ether such as ethylene oxide, propylene oxide, 1,3-dioxlane, formal of glycol and formal of diglycol, and/or a polymer containing hydroxyl group, carboxyl group, amino group, ester group or alkoxy group to copolymerization and/or block copolymer, the composition having an oxymethylene unit derived from cyclic oligomer such as trioxane, which is a trimer of formaldehyde, and tetraoxane, which is a tetramer of formaldehyde, in an amount of 80 mol-% or more.

The polyamide-based resin of the invention may be a polymer having an amide bond (—NHCO—) in its main chain.

Examples of the polyamide-based resin which can be preferably used in the invention include polycarolactam (nylon 6), polytetramethylene adipamide (nylon 46), polyhexamethylene adipamide (nylon 66), polyhexamethylene sebacamide (nylon 610), polyhexamethylene dodedamide (nylon 612), polyundecamethylene adipamide (nylon 116), polyundecalactam (nylon 11), polydodecalactam (nylon 12), polytrimethylhexamethylene terephthalamide (nylon TMHT), polyhexamethylene isophthalamide (nylon 6I), polynonanemethylene terephthalamide (9T), polyhexamethyleneterephthalamide (6T), polybis(4-aminocyclohexyl)methanedodecamide (nylon PACM12), polybis(3-methylaminocyclohexyl)methanedodecamide (nylon PACM12), polymethaxylylene adipamide (nylon MXD6), polyundecamethylene hexahydroterephthalamide (nylon 11T(H)), polyamide copolymer containing at least two different polyamide components selected from the foregoing polyamide-based resins, and mixture thereof.

The molecular weight or the polyamide-based resin of the invention is preferably from 10,000 to 1,000,000, more preferably from 20,000 to 500,000, most preferably from 30,000 to 200,000 as calculated in terms or weight-average molecular weight (Mw) from the standpoint of moldability and physical properties. The weight-average molecular weight of the polyamide-based resin of the invention can be determined by gel permeation chromatography (GPC) with hexafluoroisopropanol (HFIP) as a solvent and a polymethacrylic acid methyl (PMMA) as a standard sample for molecular weight.

The polystyrene-based resin of the invention is a homopolymer or copolymer prepared from styrene as an essential material or a polymer blend prepared from these polymers and other resins. The polystyrene-based resin of the invention is preferably a styrene homopolymer or a rubber-reinforced polystyrene having rubber distributed in a resin phase. Examples of the rubber-reinforced polystyrene to be used herein include a graft copolymer obtained by subjecting an aromatic vinyl monomer, and optionally at least one monomer selected from the group consisting of vinyl cyanide monomer, acrylic acid ester monomer, methacrylic acid ester monomer and vinyl monomers copolymerizable therewith to graft polymerization in the presence of a rubber-like polymer, and mixture of thermoplastic resin obtained by the polymerization of the foregoing monomers and the foregoing graft copolymer.

As the foregoing rubber-like polymer there may be used a diene-based rubber-like polymer such as polybutadiene, polybutadiene-styrene copolymer and polyisoprene, ethylene-propylene copolymer, ethylene-propylene-diene copolymer, acrylic rubber mainly composed of acrylic acid ester, isobutyrene-isoprene copolymer, polyurethane rubber or the like.

Examples of the rubber-reinforced polystyrene to be used herein include high-impact polystyrene, ABS resin, ethylene-propylene-based rubber-styrene-acrylonitrile copolymer, butadiene-based rubber-styrene-methacrylic acid copolymer, acryl rubber-styrene-acrylonitrile copolymer, ethylene-propylene-based rubber-styrene copolymer, and butadiene-based rubber-styrene-acrylonitrile-methacrylic acid methyl copolymer. Representative among these resins are ABS resin, ethylene-propylene-based rubber-styrene-acrylonitrile copolymer, and compound thereof with styrene-acrylonitrile copolymer.

An example of the acrylic resin for use in the invention is a resin mainly composed of methacrylic acid methyl. Specific examples of such a resin include copolymer comprising one or more of copolymerizable monomers such as methyl methacrylate, methyl acrylate, ethyl acrylate, n-propoyl acrylate, methyl acrylate, ethyl acrylate, n-propyl acrylate, isopropyl acrylate, butyl acrylate, acrylonitrile, acrylic acid, methacrylic acid, vinylpyridine, vinylmorpholine, vinylpyridone tetrahydrofurfuryl acrylate, N,N-dimethylaminoethyl acrylate, N,N-dimethylacrylamide, 2-hydroxyacrylate, ethylene glycol monoacrylate, glycerin monoacrylate, maleic anhydride, styrene and α-methylstyrene, heat-resistant acrylic resin, low hygroscopicity acrylic resin, and impact-resistant acrylic resin. The process for the polymerization of these monomers is not limited.

The polyester-based resin of the invention is at least one resin selected from the group consisting of (a) aromatic polyester resin, (b) polyester-based thermoplastic elastomer, (c) polyacrylate resin and (d) liquid crystal polyester.

The aromatic polyester resin (a) which can be preferably used in the invention is a thermoplastic polyester having an aromatic ring as a chain unit in the polymer. It is a polymer or copolymer obtained by the condensation reaction of an aromatic dicarboxylic acid (or ester-forming derivative thereof) with a diol (or ester-forming derivative thereof) as main components. The polymer or copolymer thus obtained preferably has a melting point of from about 180° C. to 330° C.

Examples of the foregoing dicarboxylic acid include terephthalic acid, isophthalic acid, orthophthalic acid, 1,5-naphthalenedicarboxylic acid, 2,6-naphthalenedicarboxylic acid, 4,4'-diphenyldicarboxylic acid, 3,3'-diphenyldicarboxylic acid, 4,4'-diphenylether dicarboxylic acid, 4,4'-diphenylmethane dicarboxylic acid, 4,4'-diphenylsulfonedicarboxylic acid, 4,4'-diphenyl isopropylidenedicarboxylic acid, 1,2-bis(phenoxy)ethane-4,4'-dicarboxylic acid, 2,5-anthracenedicarboxylic acid, 4,4"-p-terphenylenedicarboxylic acid, and 2,5-pyridinedicarboxylic acid. Preferred among these aromatic dicarboxylic acids are terephthalic acid, and mixture thereof. These aromatic dicarboxylic acids may comprise an aliphatic dicarboxylic acid such as adipic acid, azelaic acid, sebasic acid and dodecanedionic acid or alicyclic dicarboxylic acid such as cyclohexanedicarboxylic acid incorporated therein in an amount as small as 20 mol-% or less.

Examples of the foregoing diol component include aliphatic diol such as ethylene glycol, propylene glycol, 1,4-butanediol, neopentyl glycol, 1,5-pentanediol, 1,6-hexanediol, 2-methyl-1,3-propanediol, diethylene glycol, triethylene glycol and decamethylene glycol, alicyclic diol such as 1,4-cyclohexane dimethanol, and mixture thereof. The diol component may be copolymerized with a long-chain diol having a molecular weight of from about 400 to 6,000 such as polyethylene glycol, poly-1,3-propylene glycol, polytetramethylene glycol and mixture thereof in a small amount.

Specific examples of the aromatic polyester resin (a) include aromatic polyester such as polyethylene terephthalate, polypropylene terephthalate, polybutyrene terephthalate, polyhexylene terephthalate, polyethylene-2,6-naphthalenedicarboxylate, polybutyrene-2,6-naphthalene dicarboxylate and polyethylene-1,2-bis(phenoxy)ethane-4, 4'-dicarboxylate, and aromatic polyester copolymer such as polyethylene isophthalate/terephthalate, polybutyl isophthalate/terephthalate and polybutyl terephthalate/ decanedicarboxylate. Most preferred among these aromatic polyester resins are polybutylene terephthalate, and polyethylene terephthalate from the standpoint of mechanical properties and moldability of the resulting resin composition.

The foregoing polybutyrene terephthalate preferably has an intrinsic viscosity of from about 0.50 to 2.0 as measured at 25° C. in a 0.5 W/V % o-chlorophenol. The foregoing polyethylene terephthalate preferably has an intrinsic viscosity of from about 0.25 to 1.75 as determined under the same conditions.

The polyester-based thermoplastic elastomer (b) which can be preferably used herein is not specifically limited but may be one comprising an aromatic polyester as a hard segment and a poly(alkylene oxide)glycol and/or aliphatic polyester as a soft segment having a melting point of 150° C. or higher. Examples of the polyester-based thermoplastic elastomer (b) include polyether ester block copolymer, polyester-ester block copolymer, polyether ester-ester copolymer, and mixture thereof.

The ratio of aromatic polyester hard segment to soft segment in the polyester-based thermoplastic elastomer is preferably from 95/5 to 10/90, particularly from 90/10 to 30/70 by weight. The melting point of the polyester-based thermoplastic elastomer can be measured in accordance with JIS K7121. In some detail, 5 to 15 mg of the sample is subjected to differential scanning calorimetry (DSC) at a temperature rise rate of 20° C./min. The peak temperature on the melt curve is then measured to determine melting point. When there are found a plurality of peak temperatures, the highest peak temperature is defined as melting point.

The aromatic polyester constituting the foregoing hard segment is preferably a polymer obtained by the polycondensaton of a dicarboxylic acid component having a terephthalic acid component in an amount of about 60 mol-% and a diol component. As the dicarboxylic acid component other than terephthalic acid and diol component there may be preferably used those described with reference to the aromatic polyester resin (a). Specific examples of these components include polyetheylene terephthalate, polybutyrene terephthalate, polyethylene (terepthalate/isopthalate), polybutyrene (terephthalate/isophthalate), and mixture thereof.

Specific examples of the poly(alkylene oxide)glycol and aliphatic polyester constituting the foregoing soft segment include polyethylene glycol, poly(1,2-propylene oxide), poly(1,3-propylene oxide), poly(tetramethylene oxide) glycol, copolymer of ethylene oxide with propylene oxide, copolymer of ethylene oxide with tetrahydrofuran, polyethylene adipate, poly-ε-caprolactone, polyethylene sebacate, polybutylene sebacate, and mixture thereof.

Specific examples of the polyester-based thermoplastic elastomer (b) include polyethylene terephthalate-poly (tetramethylene oxide)glycol block copolymer, polyethylene terephthalate/isophthalate-poly(tetramethylene oxide)glycol block copolymer, polybutylene terephthalate-poly (tetramethylene oxide)glycol block copolymer, polybutyelene terephthalate/isophthalate-poly(tetramethylene oxide) glycol block copolymer, polybutylene terephthalate/ decanedicarboxylate-poly(tetramethylene oxide)glycol block copolymer, polyethylene terephthalate-poly (propylene oxide/ethylene oxide)glycol block copolymer, polybutylene terephthalate-poly(propylene oxide/ethylene oxide)glycol block copolymer, polybutylene terephthalate/ isophthalate-poly(propylene oxide/ethylene oxide)glycol block copolymer, polybutylene terephthalate/ decanedicarboxylate-poly (propylene oxide/ethylene oxide) glycol block copolymer, polybutylene terephthalate-poly (ethylene oxide)glycol block copolymer, polyethylene terephthalate-poly(ethylene oxide)glycol block copolymer, polybutylene terephthalate-polyethylene adipate block copolymer, polybutyelene terephthalate-polybutyelene adipate block copolymer, polybutylene terephthalate-polybutylene sebacate block copolymer, and polybutylene terephthalate-poly-ε-caprolactone block copolymer.

The polyacrylate resin (c) which can be preferably used in the invention is not specifically limited but can be obtained by a melt-polymerization method involving the reaction of a bifunctional phenol compound with an aromatic dicarboxylic acid in molten state at high temperature, a solution polymerization method involving the reaction of a bifunctional phenol compound with an aromatic dicarboxylic acid dichloride in an organic solvent in the presence of an amine as a deoxidizer, an interfacial polymerization method which comprises dissolving a bifunctional phenol compound and an aromatic dicarboxylic acid dichloride in two solvents which are in compatible with each other, respectively, mixing the two solutions with stirring in the presence of an alkali, and then effecting polycondensation reaction on the interface of the two solution.

The foregoing bifunctional phenol-based compound can be represented by the following general formula (1):

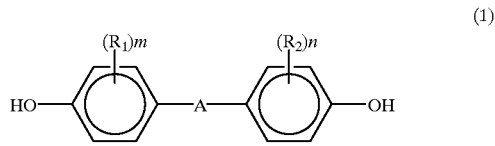

(1)

wherein $R_1$ and $R_2$ each represent a hydrogen atom, $C_{1-10}$ alkyl group or halogen atom; and m and n each represent the number of substituents which is an integer of from 0 to 4.

In the foregoing general formula (1), Ar is a group represented by the following general formula:

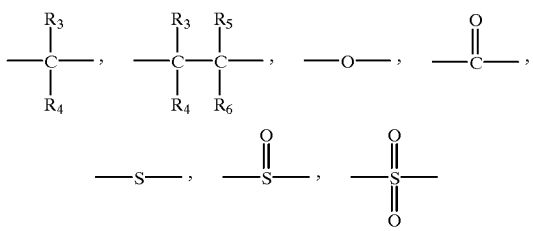

wherein $R_3$, $R_4$, $R_5$ and $R_6$ each represent a hydrogen atom or $C_{1-10}$ alkyl or phenyl group. $R_3$ and $R_4$ may be connected to each other to form a ring. $R_1$, $R_2$, $R_3$, $R_4$, $R_5$ and $R_6$ may be the same or different.

Specific examples of the foregoing bifunctional phenol group include bis(4-hydroxyphenyl)methane, 1,1-bis(4-hydroxy phenyl)ethane, 2,2-bis(4-hydroxyphenyl)propane, 2,2-bis (4-hydroxyphenyl)butane, 2,2-bis(4-hydroxyphenyl) octane, bis(4-hydroxyphenyl)phenylmethane, 2,2-bis(4-hydroxy-3-methylphenyl)propane, 1,1-bis(4-hydroxy-3-t-butylphenyl) propane, 2,2-bis(4-hydroxy-3-bromophenyl) propane, 1,1-bis (4-hydroxyphenyl)cyclopentane, 1,1-bis(4-hydroxyphenyl) cyclohexane, 4,4'-dihydroxydiphenylether, 4,4'-dihydroxy-3,3'-dimethylphenylether, 4,4'-dihydroxyphenylsulfide, 4,4'-dihydroxy-3,3'-dimethyldiphenylsulfide, 4,4'-dihydroxy diphenylsulfoxide, 4,4'-dihydroxy-3,3'-dimethyldiphenyl sulfoxide, 4,4'-dihydroxydiphenylsulfoxide, 4,4'-dihydroxy-3,3'-dimethyldiphenylsulfone, and mixture thereof. Particularly preferred among these binfunctional groups are 2,2-bis(4-hydroxyphenyl)propane, i.e., bisphenol A, and 1,1-bis(4-hydroxyphenyl)cyclohexane.

The foregoing aromatic dicarboxylic acid is not specifically limited. In practice, however, terephthalic acid, isophthalic acid, naphthalenedicarboxylic acid, mixture thereof, alkyl-substituted homologue thereof, halide thereof, or mixture thereof may be used.

In the invention, the molecular weight of the polyacrylate resin is preferably from about 5,000 to 100,000 as calculated in terms of number-average molecular weight from the standpoint of moldability and physical properties.

The liquid crystal polyester (d) which can be preferably used is a polyester called thermotropic liquid crystal polymer. As such a polyester there may be used any material known as such. Examples of such a thermotropic liquid crystal polymer include thermotropic liquid crystal polyester comprising as main constituent units p-hydroxybenzoic acid and polyethylene terephthalate, thermotropic liquid crystal polyester comprising as main constituent units p-hydroxybenzoic acid and 2-hydroxy-6-naphthoic acid, and thermotropic liquid crystal polyester comprising as main constituent units p-hydroxybenzoic acid, 4,4'-dihydroxybiphenyl and terephthalic acid. Thus, the thermotropic liquid crystal polymer to be used herein is not specifically limited. As the liquid crystal polyester (d) to be used herein there is preferably used one comprising the following structural units (a), (b), and optionally (c) and/or (d).

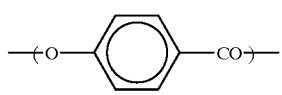
(a)

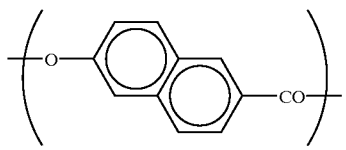
(b)

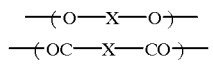
(c)
(d)

The structural units (a) and (b) are polyester structural unit produced from p-hydroxybenzoic acid and structural unit produced from 2-hydroxy-6-naphthoic acid, respectively. The use of the structural units (a) and (b) makes it possible to obtain a thermoplastic resin composition of the invention excellent in heat resistance and well balanced in mechanical properties such as fluidity and rigidity. As the symbol "X" in the foregoing structural units (c) and (d) there may be selected one or more from the following general formulae:

X:

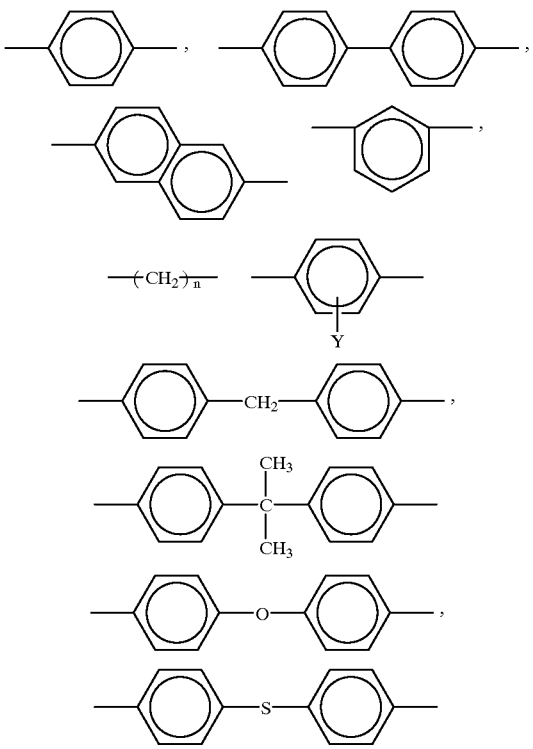

In the above formulae, n represents an integer of 1 to 6, Y represents a halogen, an alkyl group, or an aryl group.

Preferred examples of the structural formula (c) include structural units produced from ethylene glycol, hydroquinone, 4,4'-dihydroxybiphenyl, 2,6-dihydroxynaphthalene, and bisphenol A. Preferred among these structural units are structural units produced from ethylene glycol, 4,4'-dihydroxybiphenyl, and hydroquinone. Particularly preferred among these structural units are structural units produced from ethylene glycol and 4,4'-dihydroxybiphenyl. Preferred examples of the structural unit (d) include structural units produced from terephthalic acid, isophthalic acid, and 2,6-dicarboxynaphthalene. Preferred among these structural units are structural units produced from terephthalic acid, and isophthalic acid.

As the structural formulae (c) and (d) there may be used at least one or more of the foregoing structural units in combination. Specific examples of combination of two or more of these structural units (c) include (1) combination of structural unit produced from ethylene glycol and structural unit produced from hydroquinone, (2) combination of structural unit produced from ethylene glycol and structural unit produced from 4,4'-dihydroxybiphenyl, and (3) structural unit produced from hydroquinone and structural unit produced from 4,4'-dihydroxybiphenyl.

Specific examples of combination of two or more of these structural units (d) include (1) combination of structural unit produced from terephthalic acid and structural unit produced from isophthalic acid, and (2) combination of structural unit produced from terephthalic acid and structural unit produced from 2,6-dicarboxynaphthalene. The amount of terephthalic acid in the two components is preferably 40% by weight or more, more preferably 60% by weight or more, particularly 80% by weight or more. When the amount of terephthalic acid in the two components is 40% by weight or more, a resin composition having relatively good fluidity and heat resistance can be obtained. The amount of the structural units to be incorporated in the liquid crystal polyester (B) component is not specifically limited. The amount of the structural units (c) and (d) are basically equimolecular.

A structural unit (e) consisting of the structural units (c) and (d) may be used as a structural unit in the component (B). Specific examples of the structural unit (e) include (1) structural unit produced from ethylene glycol and terephthalic acid, (2) structural unit produced from hydroquinone and terephthalic acid, (3) structural unit produced from 4,4'-dihyroxybiphenyl and terephthalic acid, (4) structural unit produced from 4,4'-dihydroxybiphenyl and isophthalic acid, and (5) structural unit produced from bisphenol A and terephthalic acid.

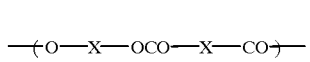

(e)

The liquid crystal polyester component (B) of the invention may comprise other structural unit produced from aromatic dicarboxylic acid, aromatic diol and aromatic hydroxycarboxylic acid incorporated therein in an amount small enough to prevent the destruction of the characteristics and effects of the invention as necessary. The temperature at which the component (B) of the invention begins to become liquid-crystalline while being in the molten state (hereinafter referred to as "liquid crystal starting temperature") is preferably from 150° C. to 350° C., more preferably from 180° C. to 320° C. When the liquid crystal starting temperature falls within the above defined range, the resulting resin composition has a desired heat resistance and well-balanced moldability.

The dielectric dissipation factor (tanδ) of the liquid crystal polyester component (B) of the invention at 25° C. and 1 MHz is preferably 0.03 or less, more preferably 0.025 or less. The smaller the dielectric dissipation factor (tanδ) of the liquid crystal polyester component (B) is, the small is the dielectric loss thereof and the more can be inhibited the generation of electrical noise to advantage. In particular, the dielectric dissipation factor (tanδ) of the liquid crystal polyester component (B) is preferably 0.03 or less, more preferably 0.025 or less at 25° C. in a high frequency range, i.e., from 1 to 10 GHz.

The apparent melt viscosity (at liquid crystal starting temperature +30 C. and a shear rate of 100/sec) of the liquid crystal polyester component (B) of the invention is preferably from 100 to 30,000 poise, more preferably from 100 to 20,000 poise, particularly from 100 to 10,000 poise. When the apparent melt viscosity falls within the above defined range, the resulting resin composition has a desired fluidity. The thermal conductivity of the component (B) of the invention in the molten state (liquid crystal state) is preferably from 0.1 to 2.0 W/mK, more preferably from 0.2 to 1.5 W/mK, particularly from 0.3 to 1.0 W/mK. When the thermal conductivity of the component (B) in the molten state falls within the above defined range, the injection molding cycle of the resulting composition can be relatively reduced.

The polycarbonate of the invention can be selected from the group consisting of aromatic homopolycarbonate and aromatic copolycarbonate. In some detail, the polycarbonate of the invention may be produced by any of phosgene method which comprises blowing phosgene through a bifunctional phenol-based compound in the presence of a caustic alkali, ester interchange method involving the ester interchange of the foregoing bifunctional phenol-based compound with a diester carbonate and solid polymerization method.

The foregoing bifunctional phenol-based compound is represented by the following general formula (1).

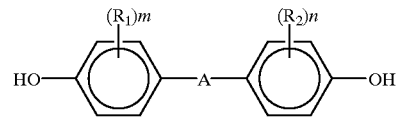

wherein $R_1$ and $R_2$ each represent a hydrogen atom, $C_{1-10}$ alkyl group or halogen atom; and m and n each represent the number of substituents which is an integer of from 0 to 4.

In the foregoing general formula (1), A represents the following group:

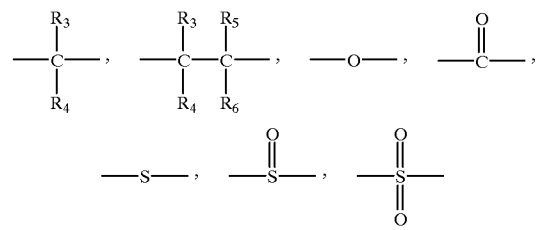

wherein $R_3$, $R_4$, $R_5$ and $R_6$ each represent a hydrogen atom or $C_{1-10}$ alkyl or phenyl group. $R_3$ and $R_4$ may be connected to each other to form a ring. $R_1$, $R_2$, $R_3$, $R_4$, $R_5$, $R_5$ and $R_6$ may be the same or different.

Specific examples of the foregoing bifunctional phenol group include bis(4-hydroxyphenyl)methane, 1,1-bis(4-hydroxy phenyl)ethane, 2,2bis(4-hydroxyphenyl)propane, 2,2-bis(4-hydroxyphenyl)butane, 2,2-bis(4-hydroxyphenyl) octane, bis(4-hydroxyphenyl)phenylmethane, 2,2-bis(4-hydroxy-3-methylphenyl)propane, 1,1-bis(4-hydroxy-3-t-butylphenyl) propane, 2,2-bis(4-hydroxy-3-bromophenyl) propane, 1,1-bis (4-hydroxyphenyl)cyclopentane, 1,1-bis(4-hydroxyphenyl) cyclohexane, 4,4'-dihydroxydiphenylether, 4,4'-dihydroxy-3,3,-dimethylphenylether, 4,4'-dihydroxyphenylsulfide, 4,4'-dihydroxy-3,3'-dimethyldiphenylsulfide, 4,4'-dihydroxy diphenylsulfoxide, 4,4'-dihydroxy-3,3'-dimethyldiphenyl sulfoxide, 4,4'- dihydroxydiphenylsulfoxide, 4,4'-dihydroxy-3,3'-dimethyldiphenylsulfone, and mixture thereof. Particularly preferred among these binfunctional groups are 2,2-bis(4-hydroxyphenyl)propane, i.e., bisphenol A, and 1,1-bis(4-hydroxyphenyl)cyclohexane.

Specific examples of the foregoing carboxylic acid diester include diphenyl carbonate, ditolyl carbonate, bis(chlorophenyl) carbonate, m-cresyl carbonate, dinaphthyl carbonate, bis(diphenyl) carbonate, diethyl carbonate, dimethyl carbonate, dibutyl carbonate, and dicyclohexyl carbonate. Preferred among these carboxylic acid diesters is diphenyl carbonate.

More preferably, the polycarbonate-based resin of the invention has a molecular weight of from 10,000 to 100,000 as calculated in terms of viscosity-average molecular weight.

The polyphenylene sulfide of the invention may be a polymer comprising a structural unit represented by the following general formula incorporated therein in an amount of 60 mol-% or more, preferably 80 mol-%.

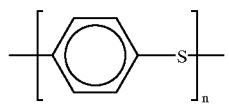

Such a polymer can be produced by a method selected from those disclosed in JP-B-44-27671 (The term "JP-B" as used herein means an "examined Japanese patent application"), JP-B-45-3368, and JP-B-52-12240.

As other structural units of the foregoing polymer there may be incorporated 40 mol-% or less, preferably 20 mol-% or less, of structural units selected from the group consisting of the following groups:

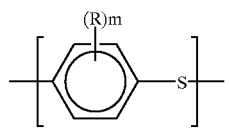

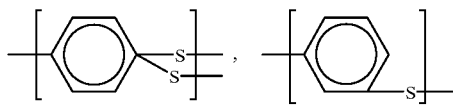

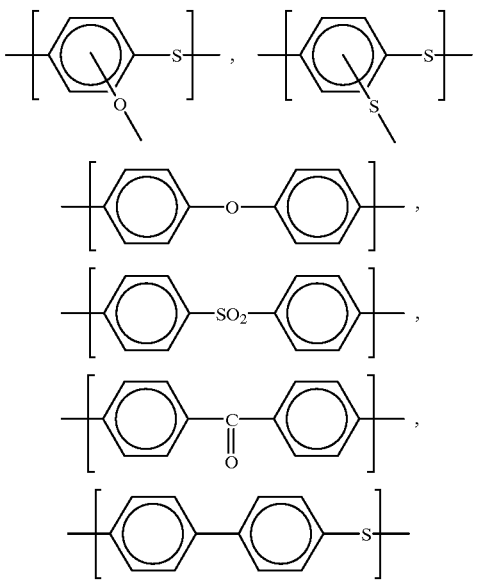

In the above formulae, R represents an alkyl group or an aryl group, m represents an integer of 1 to 4, and when m is 2 or more, a plurality of R groups may be the same or different.

The foregoing polyphenylene sulfide resin to be used herein preferably has MFR (at 230° C. and a load of 5 Kg) of from about 1 to 10,000 g/10 min, more preferably from about 10 to 5,000 g/10 min, as determined by ASTM D-1238. A polyphenylene sulfide resin obtained by mixing two polyphenylene sulfide resins having different MFR's, e.g., one having MFR of from about 1 to 300 g/10 min and another having MFR of from about 300 to 10,000 g/10 min at a ratio of from about 5/95 to 95/5, too, can be preferably used in the invention.

The polyetherimide of the invention is a resin containing a repeating unit represented by the following general formula:

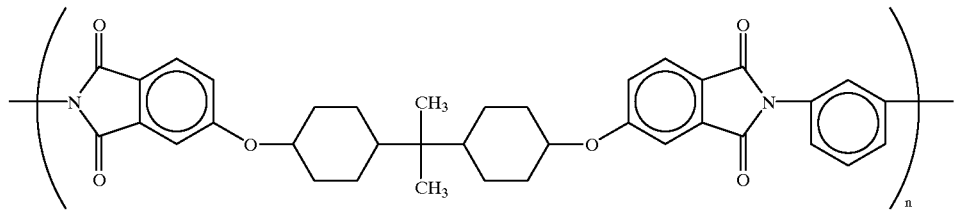

The polyethersulfone of the invention is a resin containing a repeating unit represented by the following general formula:

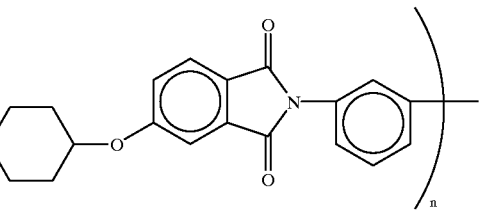

The polysulfone of the invention is a resin containing a repeating unit represented by the following general formula:

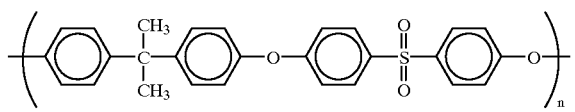

The polyether (ether) ketone of the invention is a resin containing a repeating unit represented by any one of the following general formulae (I) to (IV):

(I)

(II)

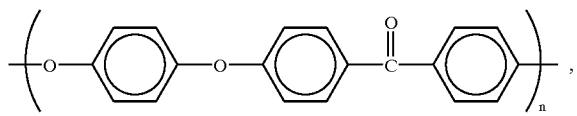

(III)

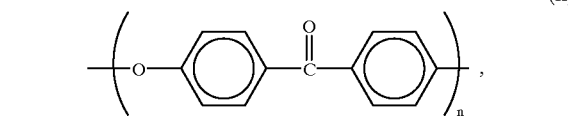

(IV)

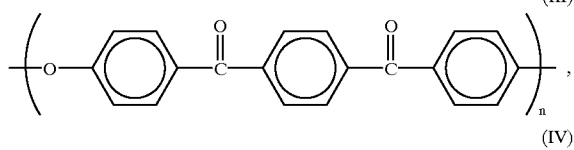

Examples of the polyolefin of the invention include polyethylene (e.g., high density polyethylene, middle density polyethylene, high pressure process low density polyethylene, straight-chain low density polyethylene, ultralow density polyethylene), polypropylene, ethylene-propylene copolymer, ethylene-butene copolymer, polypropylene-butene copolymer, polybutene, hydrogenated polybutadiene, ethylene-acrylic acid ester copolymer, ethylene-methacrylic acid ester copolymer, ethylene-acrylic acid copolymer, ethylene-vinyl acetate copolymer, and saponification product thereof. Examples of modification product of polyolefin include graft copolymer obtained by grafting one or more other vinyl compounds and polyolefin modified with a compound having an acid anhydride group, glycidyl group or the like.

Preferred among these polyolefins are homopolymer and copolymer of polyethylene (e.g., high density polyethylene, middle density polyethylene, high pressure process low density polyethylene, straight-chain low density polyethylene, ultralow density polyethylene), block copolymer comprising ethylene as a main component such as ethylene-propylene copolymer and ethylene-butene copolymer, and ionomoner.

The molecular weight of such a polyolefin-based resin is not specifically limited but is preferably from 10,000 to 1,000,000, more preferably from 10,000 to 500,000, even more preferably from 10,000 to 300,000, as calculated in terms of weight-average molecular weight.

Alternatively, a copolymer of ethylene with glycidyl methacrylate and optionally monomers such as vinyl acetate and methyl acrylate or block copolymer of these monomers may be preferably used.

As the component (A-2) there may be preferably used a modified α-olefin-based polymer. The modified α-olefin-based polymer is obtained by the graft copolymerization of 100 parts by weight of an α-olefin-based polymer as a base material with from 0.01 to 10 parts by weight of an unsaturated carboxylic acid or its anhydride unit. Examples of the unsaturated carboxylic acid or its anhydride unit as the constituent graft monomer component include unsaturated carboxylic acid such as acrylic acid, methacrylic acid, α-ethylacrylic acid, maleic acid, fumaric acid, itaconic acid, citraconic acid, tetrahydrophthalic acid, endocis-bicyclo[2,2,1]hepto-ene-2,3-dicarboxylic acid (nadic acid) and methyl-endocis-bicyclo[2,2,1]hepto-5-ene-2,3-dicarboxylic acid (methylnadic acid), and anhydride thereof such as maleic anhydride, citraconic anhydride, itaconic anhydride, tetrahydrophthalic anhydride, nadic anhydride and methylnadic anhydride. Preferred among these unsaturated carboxylic acids and anhydride thereof are unsaturated dicarboxylic acid, and methylnadic anhydride. Particularly preferred among these carboxylic acids and anhydride thereof are maleic acid, and maleic anhydride. Examples of α-olefin component unit constituting the modified α-olefin-based polymer include aliphatic substituted vinyl monomers such as ethylene, propylene, butene-1, pentene-1, 4-methylpentene-1, hexene-1, heptene-1, octene-1, nonene-1, decene-1, undecene-1, dodecene-1, tridecene-1, tetradecene-1, pentadecene-1, hexadecene-1, heptadecene-1, octadecene-1, nonadecene-1, eicocene-1 and isobutylene. These α-olefin component units may be used singly or in combination of two or more thereof. The α-olefin-based polymer may comprise as constituent components an aromatic vinyl monomer such as styrene and substituted styrene, ester-based vinyl monomer such as vinyl acetate, acrylic acid ester, methacrylic acid ester, glycidylacrylic acid ester, glycidylmethacrylic acid ester and hydroxyethylmethacrylic acid ester, nitrogen-containing vinyl monomer such as acrylamide, acrylamine, vinyl-p-aminobenzene and acrylonitrile, diene such as butadiene, cyclopentadiene, 1,4-hexadiene and isoprene, etc. incorporated therein.

The foregoing α-olefin-based polymer is preferably produced in the presence of a single site catalyst. The single site catalyst is a metalocene catalyst containing from 1 to 3 cyclopentadienyl or substituted cyclopentadienyl molecules as disclosed in JP-B-4-12283, JP-A-60-35006, JP-A-60-35007, JP-A-60-35008, JP-A-63-280703, JP-A-5-155930, JP-A-3-163088, and U.S. Pat. No. 5,272,236 or a catalyst having uniform active site properties such as geometrically-controlled catalyst.

The content of cyclopentadienyl or substituted cyclopentadienyl is preferably from 1 to 2 molecules. Examples of metal components which can be preferably used include titanium, zirconium, silicon, and hafnium. Specific preferred examples of metalocene catalyst employable herein include zirconium compounds such as cyclopentadienylzirconium trichloride, pentamethyl cyclopentadienylzirconium trichloride, bis(cyclopentadienyl) zirconium dichloride, bis (cyclopentadienyl)zirconium monomethyl monochloride, bis(methylcyclopentadienyl) zirconium dichloride, bis (peritamethylcyclopentadienyl) zirconium dichloride, bis (cyclopentadienyl)zirconium dialkyl, bis(cyclopentadienyl) zirconium diphenyl, dimethylsilyl bicyclopentadienylzirconium dimethyl and methylphosphine dicyclopentadienylzirconium dimethyl, titanium compounds such as bis(indenyl) titanium diphenyl, bis(cyclopentadienyl) titanium dialkyl, bis (cyclopentadienyl)titanium diphenyl, bis (methylcyclopentadienyl)titanium dialkyl, bis (1,2-dimethylcyclopentadienyl)titanium diphenyl and bis (1,2-dimethylcyclopentadienyl)titanium dichloride, hafnium compound such as bis(cyclopentadienyl)hafnium dichloride and bis(cyclopentadienyl)hafnium dimethyl, and vanadium compounds such as bis (cyclopentadienyl)vanadium chloride.

Specific preferred examples of the geometrically-controlled catalyst employable herein include (tertiary butylamide)-(tetramethyl-η5-cyclopentadienyl)-1,2-ethanediilzirconiun dichloride, (tertiary butylamide)-(tetramethyl-η5-cyclopetadienyl)-1,2-ethanediiltitanium dichloride, (methylamide)-(tetramethyl-η5-cyclopentadienyl) -1,2-ethanediilzirconium dichloride, (methylamide)-(tetramethyl-η5-cyclopentadienyl)-1,2-ethanediiltitanium dichloride, (ethylamide)-(tetramethyl-η5-cyclopentadienyl)- methylenetitanium dichloride, (tertiary butylamide)dimethyl- (tetramethyl-η5-cyclopentadienyl)silanetitanium dichloride, (tertiary butylamide)dimethyl(tetramethyl-η5-cyclopentadienyl) silanezirconium dibenzyl, (benzylamide) dimethylk-(tetramethyl-η5-cyclopentadienyl)silanetitanium dichloride, and (phenylphosphide)dimethyl- (tetramethyl-η5-cyclopentadienyl)silanezirocnium dibenzyl.

The single site catalyst is preferably used in combination with a cocatalyst. Specific examples of the cocatalyst employable herein include those described in the above cited patents. Preferred examples of the cocatalyst include organic aluminum oxy compound having as a repeating unit an alkyloxy aluminum such as methyl aluminoxane and ethyl aluminoxane, organic aluminum compound such as alkyl aluminum and trialkyl aluminum, [Bu$_3$NH], [B(C$_6$H$_4$R)$_4$], C$_2$B$_9$H$_{13}$, water, Lewis acid, and ammonium salt. These cocatalysts may be used singly or in combination.

Particularly preferred among the α-olefin-based polymers produced in the presence of the foregoing single site catalyst is a copolymer of ethylene with one or more C$_{3-20}$ α-olefins.

As the α-olefin-based copolymer there may also be used a copolymer of propylene with one or more C$_{3-20}$ α-olefins.

The thermoplastic resin (A) of the invention may comprise desired additives incorporated therein depending on the purpose.

Examples of the additives to be incorporated in the thermoplastic resin (A) of the invention include heat stabilizer, oxidation inhibitor, UV absorber, surface active agent, lubricant, filler, fire retardant, pigment, dye, impact modifier, polymer additives, glass fiber, carbon fiber, inorganic fiber, dialkyl peroxide, diacyl peroxide, peroxy ester, peroxy carbonate, hydroperoxide, and peroxyketal.

The carbon dioxide gas (B) of the invention is a mixture having carbon dioxide as a main component.

The carbon dioxide gas (B) of the invention is a mixture containing carbon dioxide in any of gaseous, liquid, solid and super-critical state or carbon dioxides in two or more different states, in an amount of 60% by weight or more.

The mixture comprising carbon dioxide gas (B) incorporated in the thermoplastic resin (A) of the invention may be a mixture having carbon dioxide gas (B) adsorbed to the thermoplastic resin (A), mixture having carbon dioxide gas (B) pressed in the molten thermoplastic resin (A) or mixture comprising a thermoplastic resin (A) and carbon dioxide gas (B) present in combination with each other.

The amount of carbon dioxide gas (B) to be incorporated in the mixture of the invention is from 0.3 to 20.0 parts by weight based on 100 parts by weight of the thermoplastic resin (A).

When the amount of carbon dioxide gas (B) to be incorporated in 100 parts by weight of the thermoplastic resin falls below 0.3 parts by weight, the effect of carbon dioxide gas (B) of plasticizing resin is insufficient, making it impossible to lower the viscosity of the thermoplastic resin (A) sufficiently. Accordingly, heat generation due to shearing during melt-kneading cannot be effectively inhibited, causing thermal deterioration resulting in discoloration and carbonization. The resulting thermoplastic resin pellet is disadvantageous in color tone and external appearance.

On the contrary, when the amount of carbon dioxide gas (B) to be incorporated in 100 parts by weight of the thermoplastic resin exceeds 0.3 parts by weight, the resulting mixture is unstable, making it difficult to control the melt-kneading step.

The step of melt-kneading comprises plasticizing, melting and kneading the thermoplastic resin using a mixer, and then cooling and solidifying the material.

As the mixer to be used herein there may be used any type of an apparatus having any structure and configuration so far as it is capable of melt-kneading.

Examples of the mixer employable herein include static mixer, Banbury mixer, single screw extruder, cokneader, and twin-screw extruder.

Preferred among these mixers are single screw extruder, cokneader, and twin-screw extruder. Even more desirable among these mixers are cokneader, and twin-screw extruder. Extremely preferred among these mixers is twin-screw extruder.

In the invention, the shape of the thermoplastic resin to be melt-kneaded by the mixer is not specifically limited and may be pellet, powder, liquid or the like.

The shape of the thermoplastic resin pellet obtained by melt-kneading according to the invention is not specifically limited so far as the pellet can be molded. It may be powder, grain, sphere or cube or irregular. Alternatively, the molten resin may be solidified with bubbles left behind to give a foamed pellet. Taking into account the moldability, a pellet in the form of grain, sphere, cube or the like may be used. More preferably, the pellet is less foamed.

As the means for pelletizing the thermoplastic resin there may be preferably used strand cutting method which comprises forming the melt-kneaded thermoplastic resin into strand, and the cutting the strand by a cutter, hot cutting method involving the cutting of a molten thermoplastic resin by a cutter, and underwater method involving the cutting a molten thermoplastic resin by a cutter under water.

In the invention, the foaming of pellet is preferably inhibited to an extent such that a thermoplastic resin pellet which can be molded can be obtained.

As the method for inhibiting the foaming of the thermoplastic resin pellet of the invention there may be used a method involving the dissipation of carbon dioxide gas during melt-kneading.

As the method for dissipating carbon dioxide gas there may be used a method which comprises dissipating carbon dioxide gas through the vent of an, if used as a mixer, to the atmosphere or into a suction pump, if connected to the vent.

In this case, the gas pressure at the vent can be properly adjusted to control the dissipated amount of gas.

In order to inhibit the heat generation due to shearing of the thermoplastic resin after the dissipation of carbon dioxide gas, it is preferred that gas dissipation be effected at the vent close to the die.

If the foaming of the thermoplastic resin pellet can be inhibited to some extent, it is not necessarily required to dissipate all carbon dioxide gas from the mixture which is being melt-kneaded.

In the invention, carbon dioxide gas which has been left behind in the mixture which is being melt-kneaded can be dissipated from the die and the surface of strand, if a twin-screw extruder is used as a mixer, without foaming the thermoplastic resin. Thus, this method is preferred to obtain a pellet free of foam.

Carbon dioxide gas which has been left behind in the thermoplastic resin pellet cooled can be spontaneously dissipated it the pellet is allowed to stand in the atmosphere. Thus, the thermoplastic resin pellet cannot be foamed.

In accordance with the method of the invention, extremely strong heat generation due to shearing which occurs when the thermoplastic resin solid is melted, which is the greatest cause of discoloration and carbonization of the thermoplastic resin pellet during melt-kneading, can be inhibited.

In the invention, the cylinder temperature of the extruder during melt-kneading may be any value lower than the cylinder temperature commonly used to melt-knead the thermoplastic resin and such that melt-kneading can be made. Within this cylinder temperature range, the resulting pellet can be provided with improved color tone and external appearance.

In accordance with the process for the production of thermoplastic resin pellet of the invention, if the thermoplastic resin (A) is an amorphous thermoplastic resin, a desirable thermoplastic resin pellet can be obtained when the melt-kneading temperature of the thermoplastic resin (A) is not higher than (glass transition temperature +150° C.).

In accordance with the process for the production of thermoplastic resin pellet of the invention, if the thermoplastic resin (A) is a crystalline thermoplastic resin, a desirable thermoplastic resin pellet can be obtained when the melt-kneading temperature of the thermoplastic resin (A) is not higher than (glass transition temperature +150° C.).

The melt-kneading temperature of the invention is the temperature of the mixer in operation.

The melt-kneading temperature of the invention can be substituted by the predetermined temperature of the mixer so far as there is no substantial difference therebetween.

In the invention, the melt-kneading temperature is preferably not higher than (glass transition temperature of the thermoplastic resin (A)+100° C.), more preferably not higher than (melting point of the thermoplastic resin (A)+70° C.).

In the invention, when the melt-kneading temperature is not higher than (glass transition temperature of the thermoplastic resin (A)+50° C.) or not higher than (melting point of the thermoplastic resin (A)+40° C.), an extremely desirable effect can be exerted.

In the invention, as the method for incorporating carbon dioxide gas (B) in the thermoplastic resin (A) there is preferably used a method which comprises bringing the thermoplastic resin (A) into contact with carbon dioxide gas (B) at a pressure of from 0.1 MPa to 15 MPa for 0.1 seconds or more before melt-kneading so that carbon dioxide gas (B) is incorporated in the thermoplastic resin (A).

In the invention, as the method for incorporating carbon dioxide gas (B) in the thermoplastic resin (A) there is more preferably used a method which comprises bringing the thermoplastic resin (A) into contact with carbon dioxide gas (B) at a pressure of from 0.4 MPa to 10 MPa for 10 seconds or more before melt-kneading.

In the invention, as the method for incorporating carbon dioxide gas (B) in the thermoplastic resin (A) there is extremely preferably used a method which comprises bringing the thermoplastic resin (A) into contact with carbon dioxide gas (B) at a pressure of from 1 MPa to 5 MPa for 100 seconds or more before melt-kneading.

In the invention, as the method for incorporating carbon dioxide gas (B) in the thermoplastic resin (A) there is also preferably used a method which comprises injecting a thermoplastic resin (A) being melt-kneaded and carbon dioxide gas (B) into the extruder through the cylinder. In this case, the injection pressure of carbon dioxide gas (B) needs to be not lower than the resin pressure at the gas injection position in the extruder. In the case where carbon dioxide gas (B) is injected through the vent, it can be effected at a pressure as low as about 0.1 MPa. In the case where carbon dioxide gas (B) is injected through the compression-kneading portion of the extruder, a pressure of about 30 MPa is needed. Further, it is important to keep the injection rate of carbon dioxide gas (B) constant. To this end, it is preferred that a plunger pump be used as a constant rate pump. It is also preferred that the gas flow rate be controlled by feedback control of gas supply pressure on the basis of measurements of gas flow rate.

Whichever method is used to incorporate carbon dioxide gas (B) in the thermoplastic resin (A), it is preferred that the atmosphere in the vicinity of the hopper through which the resin is supplied into the extruder be carbon dioxide gas. In this arrangement, the high temperature resin can be prevented from coming in contact with oxygen, making it possible to inhibit the oxidative deterioration of the resin. Further, nitrogen, which impairs plasticization stability, can be removed.

In the invention, when the glass transition temperature of the thermoplastic resin (A) is as high as from 110° C. to 250° C. required for extrusion kneading, the resulting thermoplastic resin pellet has remarkably improved color tone and external appearance.

The glass transition temperature of the amorphous thermoplastic resin of the invention is defined by the on-set temperature on the temperature-heat flow rate graph obtained when heat rise of 20° C./min is effected at the measurement of differential scanning calorimetry (DSC) of thermoplastic resin.

The glass transition temperature of the invention is defined by the highest value among a plurality of on-set temperatures, if any.

The melting point of the crystalline thermoplastic resin of the invention is defined by the peak temperature on the temperature-heat flow rate graph obtained when heat rise of 20° C./min is effected at the measurement of differential scanning calorimetry (DSC).

In the invention, if the thermoplastic resin is a modified polyphenylene ether resin, the resulting thermoplastic resin pellet has remarkably improved color tone.

The usage of the thermoplastic resin of the invention is not limited.

The thermoplastic resin of the invention can be preferably used for purposes requiring good color tone in the art of electric and electronic appliances, automobile, other various industrial materials, and food packaging.

Due to the effect of carbon dioxide gas (B) of plasticizing resin, the thermoplastic resin of the invention is no liable to problems such as discoloration and carbonization during melt-kneading and thus exhibits good color tone and external appearance. Further, since the thermoplastic resin pellet thus obtained has no carbon dioxide gas (B) left behind, the heat resistance and mechanical properties of the thermoplastic resin are equal to the original heat resistance and mechanical properties of the thermoplastic resin (A) from which the pellet is produced.

In other words, due. to the effect of carbon dioxide gas of plasticizing resin, the thermoplastic resin composition of the invention exhibits a reduced resin viscosity during melt-kneading and thus undergoes remarkably depressed heat generation due to shearing and hence no heat deterioration and discoloration/carbonization. Accordingly, the thermoplastic resin pellet of the invention has excellent color tone and external appearance.

Further, since the thermoplastic resin pellet of the invention has no carbon dioxide gas left behind, it exhibits heat resistance and mechanical properties characteristic to thermoplastic resin.

Accordingly, when the thermoplastic resin pellet of the invention is worked by various molding methods, a molded article excellent all in color tone, external appearance, heat resistance and mechanical properties can be obtained, making it possible to provide products and parts that can sufficiently meet the demands of various industries.

EXAMPLES

The present invention will be further described in the following examples, but the present invention should not be construed as being limited thereto.

The following thermoplastic resins (A) were used in the following examples and comparative examples.

A-1: Poly(2,6-dimethyl-1,4-phenyleneether) having a reduced viscosity of 0.54 obtained by the oxidative polymerization of 2,6-dimethylphenol;

A-2: Poly(2,6-dimethyl-1,4-phenyleneether) having a reduced viscosity of 0.31 obtained by the oxidative polymerization of 2,6-dimethylphenol;

A-3: Polyamide resin (Leona 1300S, produced by ASAHI CHEMICAL INDUSTRY CO., LTD.);

A-4: Modified polyphenylene ether resin (Zylon 500H, produced by ASAHI CHEMICAL INDUSTRY CO., LTD.);

A-5: Polyetherimide (Ultem1 1000, produced by GE);

A-6: Polyethersulfone (Victrex 200p, produced by ICI);

A-7: ABS resin (Stylac IM15, produced by ASAHI CHEMICAL INDUSTRY CO., LTD.);

A-8: Polystyrene (Stylon G9305, produced by ASAHI CHEMICAL INDUSTRY CO., LTD.);

A-9: Polyacetal (Tenac 3010, produced by ASAHI CHEMICAL INDUSTRY CO., LTD.);

A-10: PMMA resin (Delpet 80N, produced by ASAHI CHEMICAL INDUSTRY CO., LTD.);

The following carbon dioxide gases (B) were used in the following examples and comparative examples.

B-1: Dry ice;

B-2: A carbon dioxide gas having a pressure of 0.07 MPa at 35° C.;

B-3: A carbon dioxide gas having a pressure of 0.15 MPa at 35° C.;

B-4: A carbon dioxide gas having a pressure of 0.3 MPa at 35° C.;

B-5: A carbon dioxide gas having a pressure of 0.5 MPa at 35° C.;

B-6: A carbon dioxide gas having a pressure of 0.8 MPa at 35° C.;

B-7: A carbon dioxide gas having a pressure of 1.2 MPa at 35° C.;

B-8: A carbon dioxide gas having a pressure of 4 MPa at 35° C.;

B-9: A carbon dioxide gas having a pressure of 6 MPa at 35° C.;

B-10: A carbon dioxide gas having a pressure of 8 MPa at 35° C.;

B-12: A carbon dioxide gas having a pressure of 12 MPa at 35° C.;

B-13: A carbon dioxide gas having a pressure of 15 MPa at 35° C.;

In the following examples and comparative examples, glass transition temperature and melting point were evaluated in the following manners.

In some detail, the thermoplastic resin (A) is subjected to differential scanning calorimetry (DSC). The on-set temperature on the temperature-heat flow rate graph obtained when heat is raised at a rate of 20° C./min is defined to be glass transition temperature.

The thermoplastic resin (A) is similarly subjected to differential scanning calorimetry (DSC). The peak temperature on the temperature-heat flow rate graph obtained when heat is raised at a rate of 20° C./min is defined to be melting point.

In the following examples and comparative examples, the molded article is evaluated for color tone and external appearance in the following manners.

In some detail, the thermoplastic resin pellet of the invention is injection-molded using an injection molding machine to obtain a molded article having a flat shape and a dimension of 50×80×3 mm. The molded article is then evaluated for color tone and external appearance by observing the color thereof and the number of foreign matters therein.

In the following examples and comparative examples, the molded article is evaluated for heat resistance and mechanical properties in the following manners.

In some detail, the thermoplastic resin pellet of the invention is injection-molded to test specimens according to ASTM using an injection molding machine. The test specimens are then measured for heat deformation temperature (ASTM D-648: 18.6 Kg/cm$^2$ load), tensile strength (ASTM D-638; 23° C.), flexural modulus (ASTM D-790; 23° C.) and (notched) Izod impact strength (ASTM D-256: 23° C.) according to ASTM to evaluate the heat resistance and mechanical properties of the molded article.

Example 1

Into an autoclave with a gas inlet port were charged 100 parts by weight of the thermoplastic resin (A-1). The autoclave was then hermetically sealed. Carbon dioxide gas (B-7) was then supplied into the autoclave through the gas inlet port. When the pressure in the autoclave became equal to the pressure of carbon dioxide gas (B-7), the autoclave was then allowed to stand for 2 hours. As a result, a mixture (C-1-7) having carbon dioxide gas adsorbed to the thermoplastic resin (A-1) in an amount of 2.8 parts by weight was obtained.

The glass transition temperature of the thermoplastic resin (A) was 215° C.

Using a Type ZSK-25 mutual engagement twin-screw extruder produced by Welner Inc. of Germany which had been predetermined to 280° C. at the cylinder, the mixture (C-1-7) was then subjected to melt-kneading at a feed rate of 12 kg/hr. During this melt-kneading process, carbon dioxide gas was observed to be dissipated through the feed port and side vent. A strand-shaped molten resin which had been extruded through the extruder was cooled with water, and then pelletized by a strand cutter to obtain a thermoplastic resin pellet (D-1-7) free of bubbles of carbon dioxide gas.

A flat plate obtained by molding the thermoplastic resin pellet (D-1-7) had a color tone of light yellow and was observed containing foreign matters.

Referring to the physical properties of the molded article of the thermoplastic resin pellet (D-1-7), the thermal deformation temperature was 188° C., the tensile strength was 760 kg/cm$^2$, the flexural modulus was 26,000 kg/cm$^2$, and the Izod strength was 5.5 kg·cm/cm.

Comparative Example 1

Using a Type ZSK-25 mutual engagement twin-screw extruder produced by Welner Inc. of Germany which had been predetermined to 280° C. at the cylinder, the thermoplastic resin (A-1) was then subjected to melt-kneading at a feed rate of 12 kg/hr to obtain a thermoplastic resin pellet (E-1). A flat plate obtained by molding the thermoplastic resin pellet (E-1) was brown and observed containing a large amount of foreign matters.

Referring to the physical properties of the molded article of the thermoplastic resin pellet (E-1), the thermal deformation temperature was 186° C., the tensile strength was 730 kg/cm$^2$, the flexural modulus was 25,000 kg/cm$^2$, and the Izod strength was 4 kg·cm/cm.

Example 2

The glass transition temperature of the thermoplastic resin (A-2) was 212° C.

Using a Type ZSK-25 mutual engagement twin-screw extruder produced by Weiner Inc. of Germany equipped with a cap having nozzles at a side vent 1 provided shortly after the melting zone, with the side vent 2 before die being open, which had been predetermined to 280° C. at the cylinder, the thermoplastic resin (A-2) was subjected to melt-kneading.

In some detail, the thermoplastic resin (A-2) was supplied into the extruder through the feed port at a feed rate of 12 kg/hr while carbon dioxide gas (B-9) was pressed into the extruder at a feed rate of 0.60 kg/hr.

The content of carbon dioxide gas based on 100 parts by weight of the thermoplastic resin (A-2) was 5.0 parts by weight.

Carbon dioxide gas was observed to be dissipated through the side vent 2 at the atmosphere. The gas thus dissipated was then introduced into a condenser. The amount of dissipated carbon dioxide gas measured at room temperature was 0.58 kg/hr. An unfoamed strand-shaped molten resin which had been extruded through the extruder was cooled with water, and then pelletized by a strand cutter to obtain a thermoplastic resin pellet (D-2-9).

A flat plate obtained by molding the thermoplastic resin pellet (D-2-9) had a color tone of light yellow and was observed containing foreign matters.

Referring to the physical properties of the molded article of the thermoplastic resin pellet (D-2-9), the thermal deformation temperature was 187° C., the tensile strength was 750 kg/cm$^2$, the flexural modulus was 25,500 kg/cm$^2$, and the Izod strength was 5 kg·cm/cm.

Comparative Example 2

The thermoplastic resin (A-2) was subjected to melt-kneading in the same manner as in Example 2 except that the pressing of carbon dioxide gas (B-9) was suspended. Thus, a thermoplastic resin pellet (E-2) was obtained.

A flat plate obtained by molding the thermoplastic resin pellet (E-2) was brown and observed containing a large amount of foreign matters.

Referring to the physical properties of the molded article of the thermoplastic resin pellet (E-2), the thermal deformation temperature was 184° C., the tensile strength was 730 kg/cm$^2$, the flexural modulus was 24,800 kg/cm$^2$, and the Izod strength was 3.8 kg·cm/cm.

Example 3

Using a Type ZSK-25 mutual engagement twin-screw extruder produced by Welner Inc. of Germany equipped with a cap having nozzles at a side vent 1 provided shortly after the melting zone, with the side vent 2 before die being open, which had been predetermined to 280° C. at the cylinder, the thermoplastic resin (A-3) was subjected to melt-kneading.

In some detail, the thermoplastic resin (A-3) was supplied into the extruder through the feed port at a feed rate of 12 kg/hr while carbon dioxide gas (B-9) was pressed into the extruder at a feed rate of 0.60 kg/hr.

The content of carbon dioxide gas based on 100 parts by weight of the thermoplastic resin (A-3) was 5.0 parts by weight.

Carbon dioxide gas was observed to be dissipated through the side vent 2. An unfoamed strand-shaped molten resin which had been extruded through the extruder was cooled with water, and then pelletized by a strand cutter to obtain a thermoplastic resin pellet (D-3-9). A flat plate obtained by molding the thermoplastic resin pellet (D-3-9) was white and was observed containing no foreign matters.

Referring to the physical properties of the molded article of the thermoplastic resin pellet (D-3-9), the thermal deformation temperature was 72° C., the tensile strength was 830 kg/cm$^2$, the flexural modulus was 29,500 kg/cm$^2$, and the Izod strength was 4.8 kg·cm/cm.

Comparative Example 3

The thermoplastic resin (A-3) was subjected to melt-kneading in the same manner as in Example 3 except that the pressing of carbon dioxide gas (B-9) was suspended. Thus, a thermoplastic resin pellet (E-3) was obtained. A flat plate obtained by molding the thermoplastic resin pellet (E-3) had a color tone of light yellow and was observed containing a small amount of foreign matters.

Referring to the physical properties of the molded article of the thermoplastic resin pellet (E-3), the thermal deformation temperature was 70° C., the tensile strength was 830 kg/cm$^2$, the flexural modulus was 29,000 kg/cm$^2$, and the Izod strength was 4.0 kg·cm/cm.

Example 4

Using a Type ZSK-25 mutual engagement twin-screw extruder produced by Welner Inc. of Germany equipped with a cap having nozzles at a side vent 1 provided shortly after the melting zone, with the side vent 2 before die being open, which had been predetermined to 280° C. at the cylinder, the thermoplastic resin (A-4) was subjected to melt-kneading.

The glass transition temperature of the thermoplastic resin (A-4) was 153° C.

In some detail, the thermoplastic resin (A-4) was supplied into the extruder through the feed port at a feed rate of 12 kg/hr while carbon dioxide gas (B-9) was pressed into the extruder at a feed rate of 0.60 kg/hr.

The content of carbon dioxide gas based on 100 parts by weight of the thermoplastic resin (A-4) was 5.0 parts by weight.

Carbon dioxide gas was observed to be dissipated through the side vent 2. An unfoamed strand-shaped molten resin which had been extruded through the extruder was cooled with water, and then pelletized by a strand cutter to obtain a thermoplastic resin pellet (D-4-9). A flat plate obtained by molding the thermoplastic resin pellet (D-4-9) had a color tone of light yellow and was observed containing no foreign matters.

Referring to the physical properties of the molded article of the thermoplastic resin pellet (D-4-9), the thermal deformation temperature was 125° C., the tensile strength was 520 kg/cm$^2$, the flexural modulus was 24,500 kg/cm$^2$, and the Izod strength was 15.5 kg·cm/cm.

Comparative Example 4

The thermoplastic resin (A-4) was subjected to melt-kneading in the same manner as in Example 4 except that the pressing of carbon dioxide gas (B-9) was suspended. Thus, a thermoplastic resin pellet (E-4) was obtained. A flat plate obtained by molding the thermoplastic resin pellet (E-4) had a color tone of light yellow and was observed containing a small amount of foreign matters.

Referring to the physical properties of the molded article of the thermoplastic resin pellet (E-4), the thermal deformation temperature was 120° C., the tensile strength was 500 kg/cm$^2$, the flexural modulus was 24,300 kg/cm$^2$, and the Izod strength was 14.4 kg·cm/cm.

Example 5

Using a Type ZSK-25 mutual engagement twin-screw extruder produced by Welner Inc. of Germany equipped with a cap having nozzles at a side vent 1 provided shortly after the melting zone, with the side vent 2 before die being open, which had been predetermined to 300° C. at the cylinder, the thermoplastic resin (A-5) was subjected to melt-kneading.

The glass transition temperature of the thermoplastic resin (A-5) was 225° C.

In some detail, the thermoplastic resin (A-5) was supplied into the extruder through the feed port at a feed rate of 12 kg/hr while carbon dioxide gas (B-9) was pressed into the extruder at a feed rate of 0.60 kg/hr.

The content of carbon dioxide gas based on 100 parts by weight of the thermoplastic resin (A-5) was 5.0 parts by weight.

Carbon dioxide gas was observed to be dissipated through the side vent 2. An unfoamed strand-shaped molten resin which had been extruded through the extruder was cooled with water, and then pelletized by a strand cutter to obtain a thermoplastic resin pellet (D-5-9). A flat plate obtained by molding the thermoplastic resin pellet (D-5-9) had a color tone of light brown and was observed containing no foreign matters.

Referring to the physical properties of the molded article of the thermoplastic resin pellet (D-5-9), the thermal deformation temperature was 202° C., the tensile strength was 1,070 kg/cm$^2$, the flexural modulus was 33,500 kg/cm$^2$, and the Izod strength was 5.5 kg·cm/cm.

Comparative Example 5

The thermoplastic resin (A-5) was subjected to melt-kneading in the same manner as in Example 5 except that the pressing of carbon dioxide gas (B-9) was suspended. Thus, a thermoplastic resin pellet (E-5) was obtained. A flat plate obtained by molding the thermoplastic resin pellet (E-4) was brown and was observed containing a large amount of foreign matters.

Referring to the physical properties of the molded article of the thermoplastic resin pellet (E-5), the thermal deformation temperature was 202° C., the tensile strength was 1,040 kg/cm$^2$, the flexural modulus was 33,000 kg/cm$^2$, and the Izod strength was 4.5 kg·cm/cm.

Example 6

Using a Type ZSK-25 mutual engagement twin-screw extruder produced by Welner Inc. of Germany equipped with a cap having nozzles at a side vent 1 provided shortly after the melting zone, with the side vent 2 before die being open, which had been predetermined to 320° C. at the cylinder, the thermoplastic resin (A-5) was subjected to melt-kneading.

The glass transition temperature of the thermoplastic resin (A-6) was 225° C.

In some detail, the thermoplastic resin (A-6) was supplied into the extruder through the feed port at a feed rate of 12 kg/hr while carbon dioxide gas (B-9) was pressed into the extruder at a feed rate of 0.60 kg/hr.

The content of carbon dioxide gas based on 100 parts by weight of the thermoplastic resin (A-6) was 5.0 parts by weight.

Carbon dioxide gas was observed to be dissipated through the side vent 2. An unfoamed strand-shaped molten resin which had been extruded through the extruder was cooled with water, and then pelletized by a strand cutter to obtain a thermoplastic resin pellet (D-6-9). A flat plate obtained by molding the thermoplastic resin pellet (D-6-9) had a color tone of light yellow and was observed containing no foreign matters.

Referring to the physical properties of the molded article of the thermoplastic resin pellet (D-6-9), the thermal deformation temperature was 205° C., the tensile strength was 900 kg/cm$^2$, the flexural modulus was 27,500 kg/cm$^2$, and the Izod strength was 9.5 kg·cm/cm.

Comparative Example 6

The thermoplastic resin (A-6) was subjected to melt-kneading in the same manner as in Example 6 except that the pressing of carbon dioxide gas (B-9) was suspended. Thus, a thermoplastic resin pellet (E-6) was obtained. A flat plate obtained by molding the thermoplastic resin pellet (E-6) had a color tone of light yellow and was observed containing a small amount of foreign matters.

Referring to the physical properties of the molded article of the thermoplastic resin pellet (E-6), the thermal deformation temperature was 201° C., the tensile strength was 850 kg/cm$^2$, the flexural modulus was 26,300 kg/cm$^2$, and the Izod strength was 8.6 kg·cm/cm.

Example 7

Using a Type ZSK-25 mutual engagement twin-screw extruder produced by Weiner Inc. of Germany equipped with a cap having nozzles at a side vent 1 provided shortly after the melting zone, with the side vent 2 before die being open, which had been predetermined to 240° C. at the cylinder, the thermoplastic resin (A-7) was subjected to melt-kneading.

The glass transition temperature of the thermoplastic resin (A-7) was 115° C.

In some detail, the thermoplastic resin (A-7) was supplied into the extruder through the feed port at a feed rate of 12 kg/hr while carbon dioxide gas (B-9) was pressed into the extruder at a feed rate of 0.60 kg/hr.

The content of carbon dioxide gas based on 100 parts by weight of the thermoplastic resin (A-7) was 5.0 parts by weight.

Carbon dioxide gas was observed to be dissipated through the side vent 2. An unfoamed strand-shaped molten resin which had been extruded through the extruder was cooled with water, and then pelletized by a strand cutter to obtain a thermoplastic resin pellet (D-7-9). A flat plate obtained by molding the thermoplastic resin pellet (D-7-9) was white and was observed containing no foreign matters.

Referring to the physical properties of the molded article of the thermoplastic resin pellet (D-7-9), the thermal deformation temperature was 93° C., the tensile strength was 460 kg/cm$^2$, the flexural modulus was 27,500 kg/cm$^2$, and the Izod strength was 32 kg·cm/cm.

Comparative Example 7

The thermoplastic resin (A-7) was subjected to melt-kneading in the same manner as in Example 7 except that the pressing of carbon dioxide gas (B-9) was suspended. Thus, a thermoplastic resin pellet (E-7) was obtained. A flat plate obtained by molding the thermoplastic resin pellet (E-7) was white and was observed containing a small amount of foreign matters.

Referring to the physical properties of the molded article of the thermoplastic resin pellet (E-7), the thermal deformation temperature was 90° C., the tensile strength was 450 kg/cm$^2$, the flexural modulus was 27,000 kg/cm$^2$, and the Izod strength was 27 kg·cm/cm.

Example 8

Using a Type ZSK-25 mutual engagement twin-screw extruder produced by Welner Inc. of Germany equipped with a cap having nozzles at a side vent 1 provided shortly after the melting zone, with the side vent 2 before die being open, which had been predetermined to 220° C. at the cylinder, the thermoplastic resin (A-8) was subjected to melt-kneading.

The glass transition temperature of the thermoplastic resin (A-8) was 108° C.

In some detail, the thermoplastic resin (A-8) was supplied into the extruder through the feed port at a feed rate of 12 kg/hr while carbon dioxide gas (B-9) was pressed into the extruder at a feed rate of 0.60 kg/hr.

The content of carbon dioxide gas based on 100 parts by weight of the thermoplastic resin (A-8) was 5.0 parts by weight.

Carbon dioxide gas was observed to be dissipated through the side vent 2. An unfoamed strand-shaped molten resin which had been extruded through the extruder was cooled with water, and then pelletized by a strand cutter to obtain a thermoplastic resin pellet (D-8-9). A flat plate obtained by molding the thermoplastic resin pellet (D-8-9) was colorless and transparent and was observed containing no foreign matters.

Referring to the physical properties of the molded article of the thermoplastic resin pellet (D-8-9), the thermal deformation temperature was 89° C., the tensile strength was 550 kg/cm$^2$, the flexural modulus was 34,500 kg/cm$^2$, and the Izod strength was 1.8 kg·cm/cm.

Comparative Example 8

The thermoplastic resin (A-8) was subjected to melt-kneading in the same manner as in Example 8 except that the pressing of carbon dioxide gas (B-9) was suspended. Thus, a thermoplastic resin pellet (E-8) was obtained. A flat plate obtained by molding the thermoplastic resin pellet (E-8) was transparent but had a color tone of light yellow and was observed containing a small amount of foreign matters.

Referring to the physical properties of the molded article of the thermoplastic resin pellet (E-8), the thermal deformation temperature was 87° C., the tensile strength was 530 kg/cm$^2$, the flexural modulus was 33,300 kg/cm$^2$, and the Izod strength was 1.6 kg·cm/cm.

Example 9

Using a Type ZSK-25 mutual engagement twin-screw extruder produced by Welner Inc. of Germany equipped with a cap having nozzles at a side vent 1 provided shortly after the melting zone, with the side vent 2 before die being open, which had been predetermined to 220° C. at the cylinder, the thermoplastic resin (A-9) was subjected to melt-kneading.

In some detail, the thermoplastic resin (A-9) was supplied into the extruder through the feed port at a feed rate of 12 kg/hr while carbon dioxide gas (B-9) was pressed into the extruder at a feed rate of 0.60 kg/hr.

The content of carbon dioxide gas based on 100 parts by weight of the thermoplastic resin (A-9) was 5.0 parts by weight.

Carbon dioxide gas was observed to be dissipated through the side vent 2. An unfoamed strand-shaped molten resin which had been extruded through the extruder was cooled with water, and then pelletized by a strand cutter to obtain a thermoplastic resin pellet (D-9-9). A flat plate obtained by molding the thermoplastic resin pellet (D-9-9) was white and was observed containing no foreign matters.

Referring to the physical properties of the molded article of the thermoplastic resin pellet (D-9-9), the thermal deformation temperature was 127° C., the tensile strength was 710 kg/cm$^2$, the flexural modulus was 28,500 kg/cm$^2$, and the Izod strength was 11.5 kg·cm/cm.

Comparative Example 9

The thermoplastic resin (A-9) was subjected to melt-kneading in the same manner as in Example 9 except that the pressing of carbon dioxide gas (B-9) was suspended. Thus, a thermoplastic resin pellet (E-9)-was obtained. A flat plate obtained by molding the thermoplastic resin pellet (E-9) had a color tone of opaque white and was observed containing a small amount of foreign matters.

Referring to the physical properties of the molded article of the thermoplastic resin pellet (E-9), the thermal deformation temperature was 125° C., the tensile strength was 680 kg/cm$^2$, the flexural modulus was 27,300 kg/cm$^2$, and the Izod strength was 10.4 kg·cm/cm.

Example 10

Using a Type ZSK-25 mutual engagement twin-screw extruder produced by Welner Inc. of Germany equipped with a cap having nozzles at a side vent 1 provided shortly after the melting zone, with the side vent 2 before die being open, which had been predetermined to 240° C. at the cylinder, the thermoplastic resin (A-10) was subjected to melt-kneading.

The glass transition temperature of the thermoplastic resin (A-10) was 120° C.

In some detail, the thermoplastic resin (A-10) was supplied into the extruder through the feed port at a feed rate of 12 kg/hr while carbon dioxide gas (B-9) was pressed into the extruder at a feed rate of 0.60 kg/hr.

The content of carbon dioxide gas based on 100 parts by weight of the thermoplastic resin (A-10) was 5.0 parts by weight.

Carbon dioxide gas was observed to be dissipated through the side vent 2. An unfoamed strand-shaped molten resin which had been extruded through the extruder was cooled with water, and then pelletized by a strand cutter to obtain a thermoplastic resin pellet (D-10-9). A flat plate obtained by molding the thermoplastic resin pellet (D-10-9) was colorless and transparent and was observed containing no foreign matters.

Referring to the physical properties of the molded article of the thermoplastic resin pellet (D-10-9), the thermal deformation temperature was 103° C., the tensile strength was 760 kg/cm$^2$, the flexural modulus was 34,500 kg/cm$^2$, and the Izod strength was 1.7 kg·cm/cm.

Comparative Example 10

The thermoplastic resin (A-10) was subjected to melt-kneading in the Same manner as in Example 10 except that the pressing of carbon dioxide gas (B-9) was suspended. Thus, a thermoplastic. resin pellet (E-10) was obtained. A flat plate obtained by molding the thermoplastic resin pellet (E-10) was colorless and transparent and was observed containing a small amount of foreign matters.

Referring to the physical properties of the molded article of the thermoplastic resin pellet (E-10), the thermal deformation temperature was 99° C., the tensile strength was 740 kg/cm$^2$, the flexural modulus was 33,500 kg/cm$^2$, and the Xzod strength was 1.6 kg·cm/cm.

Example 11

The procedure of Example 1 was followed except that carbon dioxide gas (B-12) was used instead of carbon dioxide gas (B-7) As a result, a mixture (C-1-12) having carbon dioxide gas adsorbed to the thermoplastic resin (A-1) in an amount of 15.8 parts by weight was obtained.

The mixture (C-1-12) was then subjected to melt-kneading in the same manner as in Example 1 except that the cylinder temperature at and around the feed port of the extruder was predetermined to 53° C. and the cylinder temperature at other areas was predetermined to 270° C. As a result, a thermoplastic resin pellet (D-1-12) was obtained.

During this procedure, carbon dioxide gas was observed to be dissipated through the feed port and side vent of the extruder. Thus, melt-kneading became unstable.

A flat plate obtained by molding the thermoplastic resin pellet (D-1-12) had a color tone of light yellow and was observed having no foreign matters.

Referring to the physical properties of the molded article of the thermoplastic resin pellet (D-1-12), the thermal deformation temperature was 189° C., the tensile strength was 780 kg/cm$^2$, the flexural modulus was 26,200 kg/cm$^2$, and the Izod strength was 5.2 kg·cm/cm.

Comparative Example 11

The procedure of Example 1 was followed except that carbon dioxide gas (B-13) was used instead of carbon dioxide gas (B7). As a result, a mixture (C-1-13) having carbon dioxide gas adsorbed to the thermoplastic resin (A-1) in an amount of 21.5 parts by weight was obtained.

It was then attempted to melt-knead the mixture (C-1-13) in the same manner as in Example 1 except that the cylinder temperature at and around the feed port of the extruder was predetermined to 530° C. and the cylinder temperature at other areas was predetermined to 270° C. As a result, carbon dioxide gas was violently dissipated through the feed port of the extruder, making it difficult to melt-knead the mixture.

Example 12

The procedure of Example 1 was followed except that carbon dioxide gas (B-3) was used instead of carbon dioxide gas (B-7). As a result, a mixture (D-1-3) having carbon dioxide gas adsorbed to the thermoplastic resin (A-1) in an amount of 0.7 parts by weight and a thermoplastic resin pellet (D-1-3)were obtained.

A flat plate obtained by molding the thermoplastic resin pellet (D-1-3) was brown and was observed having no foreign matters.

Referring to the physical properties of the molded article of the thermoplastic resin pellet (D-1-3), the thermal deformation temperature was 187° C., the tensile strength was 740 kg/cm$^2$, the flexural modulus was 25,200 kg/cm$^2$, and the Izod strength was 5.1 kg·cm/cm.

Comparative Example 12

The procedure of Example 1 was followed except that carbon dioxide gas (B-2) was used instead of carbon dioxide gas (B-7) . As a result, a mixture (C-1-2) having carbon dioxide gas adsorbed to the thermoplastic resin (A-1) in an amount of 0.3 parts by weight and thermoplastic resin pellet (D-1-2) were obtained.

A flat plate obtained by molding the thermoplastic resin pellet (D-1-2) was brown and was observed having foreign matters.

Referring to the physical properties of the molded article of the thermoplastic resin pellet (D-1-2), the thermal deformation temperature was 183° C., the tensile strength was 710 kg/cm$^2$, the flexural modulus was 25,200 kg/cm$^2$, and the Izod strength was 4.2 kg·cm/cm.

Example 13

The procedure of Example 2 was followed except that carbon dioxide gas (B-9) was replaced by carbon dioxide gas (B-4) which was then pressed into the autoclave at a rate of 0.12 kg/hr. Thus, a mixture having a carbon dioxide gas content of 1.0 part by weight was extruded to obtain a thermoplastic resin pellet (D-2-4).

A flat plate obtained by molding the thermoplastic resin pellet (D-1-3) was brown and was observed having no foreign matters.

Referring to the physical properties of the molded article of the thermoplastic resin pellet (D-1-3), the thermal deformation temperature was 187° C., the tensile strength was 745 kg/cm$^2$, the flexural modulus was 25,000 kg/cm$^2$, and the Izod strength was 5.0 kg·cm/cm.

Comparative Example 13

The thermoplastic resin (A-2) was extruded in the same manner as in Example 13 except that carbon dioxide gas (B-2) was used instead of carbon dioxide gas (B-9). Since no carbon dioxide gas was introduced into the extruder, no carbon dioxide gas was observed to be dissipated through the side vent.

A flat plate obtained by molding the resulting thermoplastic resin was brown and was observed having many foreign particles.

Example 14

Into an autoclave were charged 100 parts by weight of the thermoplastic resin (A-3) and 5 parts by weight of the carbon dioxide gas (B-1) . The autoclave was then hermetically sealed. The autoclave was then allowed to stand for 24 hours. As a result, a mixture (C-3-1) having carbon dioxide gas adsorbed to the thermoplastic resin (A-3) in an amount of 2.4 parts by weight was obtained.

Using a Type ZSK-25 mutual engagement twin-screw extruder produced by Weiner Inc. of Germany which had been predetermined to 280° C. at the cylinder, the mixture (C-3-1) was then subjected to melt-kneading.

Carbon dioxide gas was observed to be dissipated through the feed port and side vent 2. An unfoamed strand-shaped molten resin which had been extruded through the extruder was cooled with water, and then pelletized by a strand cutter to obtain a thermoplastic resin pellet (C-3-1). A flat plate obtained by molding the thermoplastic resin pellet (C-3-1) was white and was observed containing no foreign matters.

Referring to the physical properties of the molded article of the thermoplastic resin pellet (D-3-1), the thermal deformation temperature was 71° C., the tensile strength was 830 kg/cm$^2$, the flexural modulus was 29,200 kg/cm$^2$, and the Izod strength was 4.6 kg·cm/cm.

Example 15

Into an autoclave were charged 100 parts by weight of the thermoplastic resin (A-4). The autoclave was then hermetically sealed. Carbon dioxide gas (B-5) was then supplied into the autoclave in the same manner as in Example 1. The autoclave was then allowed to stand for 4 hours. As a result, a mixture (C-4-5) having carbon dioxide gas adsorbed to the thermoplastic resin (A-4) in an amount of 1.4 parts by weight and a thermoplastic resin pellet (D-4-5) were obtained.

A flat plate obtained by molding the thermoplastic resin pellet (D-4-5) had a color tone of light yellow and was observed containing no foreign matters.

Referring to the physical properties of the molded article of the thermoplastic resin pellet (D-4-5), the thermal deformation temperature was 174° C., the tensile strength was 730 kg/cm$^2$, the flexural modulus was 27,100 kg/cm$^2$, and the Izod strength was 7.2 kg·cm/cm.

Example 16

Into an autoclave were charged 100 parts by weight of the thermoplastic resin (A-5) . The autoclave was then hermetically sealed. Carbon dioxide gas (B-6) was then supplied into the autoclave in the same manner as in Example 1. The autoclave was then allowed to stand for 4 hours. As a result, a mixture (C-5-6) having carbon dioxide gas adsorbed to the thermoplastic resin (A-5) in an amount of 1.2 parts by weight and a thermoplastic resin pellet (D-5-6) were obtained.

A flat plate obtained by molding the thermoplastic resin pellet (D-5-6) had a color tone of yellow and was observed containing no foreign matters.

Referring to the physical properties of the molded article of the thermoplastic resin pellet (D-5-6), the thermal deformation temperature was 203° C., the tensile strength was 890 kg/cm$^2$, the flexural modulus was 27,200 kg/cm$^2$, and the Izod strength was 9.1 kg·cm/cm.

Example 17

The procedure of Example 1 was followed except that carbon dioxide gas (B-8) was used instead of carbon dioxide gas (B-7). As a result, a mixture (C-1-8) having carbon dioxide gas adsorbed to the thermoplastic resin (A) in an amount of 6.8 parts by weight was obtained.

The mixture (C-1-8) was then subjected to melt-kneading in the same manner as in Example 1 except that the cylinder temperature at and around the feed port of the extruder was predetermined to 53° C. and the cylinder temperature at other areas was predetermined to 270° C. As a result, a thermoplastic resin pellet (D-1-8) was obtained.

During this procedure, carbon dioxide gas was observed to be dissipated through the feed port and side vent of the extruder. A flat plate obtained by molding the thermoplastic resin pellet (D-1-8) had a color tone of light yellow and was observed having no foreign matters.

Referring to the physical properties of the molded article of the thermoplastic resin pellet (D-1-8), the thermal deformation temperature was 189° C., the tensile strength was 770 kg/cm$^2$, the flexural modulus was 25,400 kg/cm$^2$, and the Izod strength was 5.5 kg·cm/cm.

Example 18

The procedure of Example 5 was followed except that carbon dioxide gas to be pressed into the autoclave through the side vent 1 was changed to carbon dioxide gas (B-10) . As a result, a thermoplastic resin pellet (D-5-9) was obtained. A flat plate obtained by molding the thermoplastic resin pellet (D-5-9) had a color tone of yellowish brown and was observed having no foreign matters.

Referring to the physical properties of the molded article of the thermoplastic resin pellet (D-5-9), the thermal deformation temperature was 203° C., the tensile strength was 1,070 kg/cm$^2$, the flexural modulus was 33,300 kg/cm$^2$, and the Izod strength was 5.3 kg·cm/cm.

While the invention has been described in detail and with reference to specific examples thereof, it will be apparent to one skilled in the art that various changes and modifications can be made therein without departing from the spirit and scope thereof.

What is claimed is:

1. (Amended) A process for producing a thermoplastic resin pellet, which comprises melt-kneading a thermoplastic resin to obtain a thermoplastic resin pellet, wherein said thermoplastic resin comprises:

(A) at least one thermoplastic resin selected from the group consisting of polyphenylene ether-based resins, polyacetal-based resins, polyamide-based resins, polystyrene-based resins, acrylic resins, polyester-based resins, polycarbonates, polyphenylene sulfides, polyetherimides, polyethersulfones, polysulfones, polyether (ether) ketones; and (B) carbon dioxide gas is present in said thermoplastic resin (A) in an amount of from 0.3 to 20.0 parts by weight per 100 parts by weight of said thermoplastic resin (A), and wherein said carbon dioxide gas is allowed to dissipate during said melt-kneading step, and said melt-kneaded thermoplastic resin is pelletized after said carbon dioxide dissipates during said melt-kneading step.

2. The production process according to claim 1, wherein said thermoplastic resin (A) comprises at least one combination selected from: a polyphenylene ether-based resin and a polyamide-based resin; a polyphenylene ether-based resin and a polystyrene-based resin; a polyphenylene ether-based resin and a polyolefin-based resin; a polyphenylene ether-based resin and a polyester-based resin; a polyamide-based resin and a polyolefin-based resin; and a polyacetal-based resin and a polyolefin-based resin.

3. The production process according to claim 1, wherein said thermoplastic resin (A) is a thermoplastic resin containing at least one member selected from the group consisting of polyphenylene ether-based resins, polyacetal-based resins, polyamide-based resins, polystyrene-based resins, acrylic resins, polyetherimides, and polyethersulfones.

4. The production process according to claim 1, wherein said thermoplastic resin (A) is a thermoplastic resin containing any of a polyphenylene ether-based resin, a polyacetal-based resin and a polyamide-based resin, or containing at least one combination selected from: a polyphenylene ether-based resin and a polyamide-based resin; a polyphenylene ether-based resin and a polystyrene-based resin; a polyphenylene ether-based resin and a polyolefin-based resin; a polyphenylene ether-based resin and a polyester-based resin; a polyamide-based resin and a polyolefin-based resin; and a polyacetal-based resin and a polyolefin-based resin.

5. The production process according to claim 1, wherein said melt kneading is carried out using a twin-screw extruder, and said carbon dioxide gas is dissipated through a vent in said twin-screw extruder.

6. The production process according to claim 2 wherein said melt kneading is carried out using a twin-screw extruder, and said carbon dioxide gas is dissipated through a vent in said twin-screw extruder.

7. The production process according to claim 3, wherein said melt kneading is carried out using a twin-screw extruder, and said carbon dioxide gas is dissipated through a vent in said twin-screw extruder.

8. The production process according to claim 4, wherein said melt kneading is carried out using a twin-screw extruder, and said carbon dioxide gas is dissipated through a vent in said twin-screw extruder.

9. The production process according to claim 5, wherein said vent is connected to a suction pump to dissipate said carbon dioxide gas.

10. The production process according to claim 6, wherein said vent is connected to a suction pump to dissipate said carbon dioxide gas.

11. The production process according to claim 7, wherein said vent is connected to a suction pump to dissipate said carbon dioxide gas.

12. The production process according to claim 8, wherein said vent is connected to a suction pump to dissipate said carbon dioxide gas.

* * * * *